United States Patent
Tselepis et al.

(10) Patent No.: US 10,450,483 B2
(45) Date of Patent: Oct. 22, 2019

(54) METHOD FOR COATING SILICONE RUBBER SUBSTRATE

(71) Applicant: Gaco Western, LLC, Waukesha, WI (US)

(72) Inventors: Arthur James Tselepis, Midland, MI (US); Jason Jeremy Netherton, Mount Pleasant, WI (US)

(73) Assignee: Firestone Building Products Company, LLC, Nashville, TN (US)

( * ) Notice: Subject to any disclaimer, the term of this patent is extended or adjusted under 35 U.S.C. 154(b) by 0 days.

(21) Appl. No.: 15/897,508

(22) Filed: Feb. 15, 2018

(65) Prior Publication Data

US 2018/0230332 A1  Aug. 16, 2018

Related U.S. Application Data

(60) Provisional application No. 62/459,440, filed on Feb. 15, 2017.

(51) Int. Cl.
| | | |
|---|---|---|
| *C09D 183/08* | (2006.01) | |
| *B05D 1/36* | (2006.01) | |
| *C08J 7/04* | (2006.01) | |
| *C09D 183/04* | (2006.01) | |
| *C08G 77/16* | (2006.01) | |
| *C08G 77/26* | (2006.01) | |
| *C08K 5/5435* | (2006.01) | |
| *C08K 5/5419* | (2006.01) | |
| *C08K 3/26* | (2006.01) | |
| *C08K 3/22* | (2006.01) | |
| *C08K 3/36* | (2006.01) | |
| *B05D 7/02* | (2006.01) | |
| *C08G 77/46* | (2006.01) | |

(52) U.S. Cl.
CPC ............. *C09D 183/08* (2013.01); *B05D 1/36* (2013.01); *C08J 7/042* (2013.01); *C09D 183/04* (2013.01); *B05D 7/02* (2013.01); *B05D 2203/00* (2013.01); *B05D 2518/10* (2013.01); *C08G 77/16* (2013.01); *C08G 77/26* (2013.01); *C08G 77/46* (2013.01); *C08J 2383/04* (2013.01); *C08J 2433/00* (2013.01); *C08J 2483/08* (2013.01); *C08K 3/22* (2013.01); *C08K 3/26* (2013.01); *C08K 3/36* (2013.01); *C08K 5/5419* (2013.01); *C08K 5/5435* (2013.01); *C08K 2003/2241* (2013.01); *C08K 2003/265* (2013.01)

(58) Field of Classification Search
CPC .......... C09D 183/08; B05D 1/36; B05D 7/02; B05D 2518/10; B05D 2203/00; C08J 7/042; C08J 2383/04; C08J 2433/00; C08J 2483/08; C08K 5/5435; C08K 2003/265; C08K 3/26; C08K 3/36; C08K 2003/2241; C08K 3/22; C08K 5/5419; C08G 77/16

See application file for complete search history.

(56) References Cited

U.S. PATENT DOCUMENTS

| | | | |
|---|---|---|---|
| 3,510,387 A | 5/1970 | Robb | |
| 4,293,616 A | 10/1981 | Smith, Jr. | |
| 4,472,470 A | 9/1984 | Modic | |
| 4,666,765 A * | 5/1987 | Caldwell | ................ D06N 3/128 427/358 |
| 4,827,686 A | 5/1989 | Stamper | |
| 5,071,143 A | 12/1991 | Byerly | |
| 5,236,532 A | 8/1993 | Taylor | |
| 2004/0244315 A1 | 12/2004 | Rust | |
| 2007/0010615 A1 | 1/2007 | Cogen | |
| 2007/0298252 A1 * | 12/2007 | Chen | .................. G03G 15/2057 428/339 |
| 2010/0063190 A1 | 3/2010 | Banwitz | |
| 2010/0076144 A1 | 3/2010 | Moore | |
| 2011/0076462 A1 | 3/2011 | Jette | |
| 2015/0073085 A1 | 3/2015 | Eliyahu et al. | |
| 2015/0076743 A1 | 3/2015 | Douglas | |
| 2016/0130747 A1 * | 5/2016 | Hanison | ............... D06N 3/0063 442/76 |
| 2016/0312471 A1 | 10/2016 | Hubbard | |
| 2016/0034795 A1 | 12/2016 | Setzke | |

FOREIGN PATENT DOCUMENTS

WO      2013 156996 A1    10/2013

* cited by examiner

*Primary Examiner* — William P Fletcher, III
(74) *Attorney, Agent, or Firm* — Brian D. McAlhaney; Arthur M. Reginelli

(57) ABSTRACT

A method of coating a silicone rubber substrate, the method comprising (i) applying a coating composition comprising (a) about 50-80 wt % of a water-based silicone elastomer composition; (b) about 0.5-4.0 wt % of a silane adhesion promoter; (c) about 0.02-0.5 wt % of a silicone surfactant; and (d) about 10-50 wt % water to the silicone rubber substrate to form a coated substrate; and (ii) applying an acrylic material to the coated substrate.

15 Claims, No Drawings

METHOD FOR COATING SILICONE RUBBER SUBSTRATE

CROSS-REFERENCE TO RELATED APPLICATION(S)

This application claims priority to U.S. Provisional Patent Application No. 62/459,440, filed on Feb. 15, 2017, which is hereby incorporated by reference in its entirety.

TECHNICAL FIELD

The present disclosure relates generally to silicone compositions and methods of using the composition. More specifically, the present disclosure relates to silicone coatings for a silicone rubber substrate, which may allow the silicone coatings to be further coated with a non-silicone material such as an acrylic material.

BACKGROUND

A roof that has been previously coated with silicone generally cannot be further coated with anything other than a silicone material, due to the low surface energy (i.e. difficulty in wetting) of a dimethylsiloxane surface. Additionally, silicone coatings are known for their release properties, which can make it challenging to achieve adhesion to a silicone surface by anything other than a silicone material.

SUMMARY

In one aspect, disclosed is a coating composition comprising about 50-80% by weight of a water-based silicone elastomer composition, about 0.5-4.0% by weight of a silane adhesion promoter, about 0.02-0.5% by weight of a silicone surfactant, and about 10-50% by weight water. In another aspect, disclosed are methods of preparing the coating compositions. In yet another aspect, disclosed are methods of using the coating compositions.

Other aspects of the disclosure will become apparent by consideration of the following description.

DETAILED DESCRIPTION

Disclosed herein are silicone compositions, which include a water-based silicone elastomer composition, a silane adhesion promoter, a silicone surfactant, and water. The compositions can be used for a variety of exterior applications, such as roofing applications. For example, the disclosed compositions can be used to coat existing silicone roof coatings. The silicone surfactant can allow for sufficient wetting of the existing silicone surface, while the silane adhesion promoter allows for surface modification of the water-based silicone elastomer, such that the composition will wet and adhere to an existing silicone surface and also accept a topcoat of an additional coating. An example of a non-silicone material that may be coated on to the surface of the composition is an acrylic roof coating or an acrylic paint.

The disclosed compositions can be used to repair a silicone coating on a roof. Use of the disclosed compositions may result in lower maintenance or replacement costs over a roof's lifetime.

1. Definitions

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents, and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an," and "the" include plural references unless the context clearly dictates otherwise. The present disclosure also contemplates other embodiments "comprising," "consisting of," and "consisting essentially of," the embodiments or elements presented herein, whether explicitly set forth or not.

The conjunctive term "or" includes any and all combinations of one or more listed elements associated by the conjunctive term. For example, the phrase "an apparatus comprising A or B" may refer to an apparatus including A where B is not present, an apparatus including B where A is not present, or an apparatus where both A and B are present. The phrases "at least one of A, B, . . . and N" or "at least one of A, B, . . . N, or combinations thereof" are defined in the broadest sense to mean one or more elements selected from the group comprising A, B, . . . and N, that is to say, any combination of one or more of the elements A, B, . . . or N including any one element alone or in combination with one or more of the other elements which may also include, in combination, additional elements not listed.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

As used herein, the phrase "substantially free" means that the indicated component is present in a quantity or concentration that negligibly affects the desired properties of the composition, as described herein. For example, a silicone composition substantially free of an acrylic material may mean that there is less than or equal to about 1 wt % of an acrylic material, based on total weight of the composition. In another example, a silicone composition substantially free of an acrylic material may mean that there is less than or equal to about 0.5 wt % of an acrylic material, less than or equal to about 0.4 wt % of an acrylic material, less than or equal to about 0.3 wt % of an acrylic material, less than or equal to about 0.2 wt % of an acrylic material, or less than or equal to about 0.1 wt % of an acrylic material, based on total weight of the composition.

2. Silicone Compositions

In one aspect, the disclosed silicone compositions include a water-based silicone elastomer composition, a silane adhesion promoter, a silicone surfactant, and water. The compositions may further include, for example, a silicone binder, a polysiloxane plasticizer, a reinforcing filler, a curative agent, a pigment, a catalyst, a flame retardant, a crosslinker, a pH-adjuster, solvents, or additives. In certain embodiments, the silicone compositions are substantially free of acrylic materials.

a. Water-Based Silicone Elastomer Composition

The disclosed compositions include a water-based silicone elastomer composition (also referred to as silicone rubber). While any silicone elastomer may be used, exemplary silicone elastomers include a product of a hydroxy-terminated polydimethylsiloxane polymer with a cross-linker, such as dimethyl methyl((diethylamino)oxy)siloxane.

The water-based silicone elastomer may further include, for example, a cyclic siloxane, a non-ionic surfactant, calcium carbonate, titanium dioxide, and silicone dioxide. In certain embodiments, the cyclic siloxane is octamethylcyclotetrasiloxane. In certain embodiments, the non-ionic surfactant is 2,6,8-trimethyl-4-nonyloxypolyethyleneoxyethanol.

The water-based silicone elastomer compositions may be prepared from the indicated components or may be purchased from a variety of commercial suppliers. For example, an exemplary composition is the Allguard Silicone Elastomeric Coating, available from Dow Corning.

The silicone elastomers may be used alone or as a mixture in a solvent. In certain embodiments, this solvent is water.

The silicone coating compositions may include the water-based silicone elastomer composition in an amount of about 50-80 wt % based on total weight of the composition, for example, about 55-80 wt %, about 60-80 wt %, about 65-80 wt %, about 70-80 wt %, about 75-80 wt %, about 50-75 wt %, about 50-70 wt %, about 50-65 wt %, about 50-60 wt %, about 50-55 wt %, about 55-75 wt %, about 60-70 wt %, about 50-60 wt %, about 70-80 wt %, about 55-70 wt %, about 60-75 wt %, or about 65-75 wt %, based on total weight of the composition. In certain embodiments, the water-based silicone elastomer composition content of the disclosed silicone coating compositions is about 50 wt %, about 51 wt %, about 52 wt %, about 53 wt %, about 54 wt %, about 55 wt %, about 56 wt %, about 57 wt %, about 58 wt %, about 59 wt %, about 60 wt %, about 61 wt %, about 62 wt %, about 63 wt %, about 64 wt %, about 65 wt %, about 66 wt %, about 67 wt %, about 68 wt %, about 69 wt %, about 70 wt %, about 71 wt %, about 72 wt %, about 73 wt %, about 74 wt %, about 75 wt %, about 76 wt %, about 77 wt %, about 78 wt %, about 79 wt %, or about 80 wt %, based on total weight of the composition.

b. Silane Adhesion Promoter

The disclosed compositions include a silane adhesion promoter. The silane adhesion promoter may modify the surface of the silicone elastomer, such that the silicone coating composition will wet and adhere to an existing silicone coating and also accept a further coating of a non-silicone material, such as an acrylic material.

In certain embodiments, the silane adhesion promoter is γ-glycidoxypropyltrimethoxysilane. This compound is commercially available from a variety of sources, and is also known as 3-(2,3-epoxypropoxy)propyltrimethoxysilane, GLYMO, and glycidyl 3-(trimethoxysilyl)propyl ether.

The silicone coating compositions may include the silane adhesion promoter in an amount of about 0.5-4 wt % based on total weight of the composition, for example, in an amount of about 1-4 wt %, about 1.5-4 wt %, about 2-4 wt %, about 2.5-4 wt %, about 3-4 wt %, about 3.5-4 wt %, about 0.5-3.5 wt %, about 0.5-3 wt %, about 0.5-2.5 wt %, about 0.5-2 wt %, about 0.5-1.5 wt %, about 0.5-1 wt %, about 1-3.5 wt %, about 1.5-3 wt %, about 2-2.5 wt %, about 2-3 wt %, about 1.5-2.5 wt %, or about 1-3 wt %, based on total weight of the composition. In certain embodiments, the silicone coating compositions may include the silane adhesion promoter in an amount of about 0.5 wt %, about 0.6 wt %, about 0.7 wt %, about 0.8 wt %, about 0.9 wt %, about 1 wt %, about 1.1 wt %, about 1.2 wt % about 1.3 wt %, about 1.4 wt %, about 1.5 wt %, about 1.6 wt %, about 1.7 wt %, about 1.8 wt %, about 1.9 wt %, about 2 wt %, about 2.1 wt %, about 2.2 wt %, about 2.3 wt % about 2.4 wt %, about 2.5 wt %, about 2.6 wt %, about 2.7 wt %, about 2.8 wt %, about 2.9 wt %, about 3 wt %, about 3.1 wt %, about 3.2 wt %, about 3.3 wt %, about 3.4 wt %, about 3.5 wt %, about 3.6 wt %, about 3.7 wt %, about 3.8 wt %, about 3.9 wt %, or about 4 wt %, based on total weight of the composition.

c. Silicone Surfactant

The disclosed compositions include a silicone surfactant. The silicone surfactant allows for sufficient wetting of a low-energy silicone surface, such that the surface can be further coated with additional materials.

In certain embodiments, the silicone surfactant is a polyether-polydimethylsiloxane copolymer, such as block copolymer comprising a polyalkylene oxide block (e.g., polyoxyethylene or polyoxypropylene), and a polysiloxane block (e.g., a polydialkylsiloxane block such as polydimethylsiloxane). In certain embodiments, the silicone surfactant is 3-(polyoxyethylene)propylheptamethyltrisiloxane. As used herein "3-(polyoxyethylene)propylheptamethyl-trisiloxane" refers to a compound having CAS Number 67674-67-3, which is commercially available from a variety of sources.

The silicone coating compositions may include the silicone surfactant in an amount of about 0.02-0.5 wt %, based on total weight of the composition. In certain embodiments, the silicone coating compositions may include the silicone surfactant in an amount of about 0.04-0.5 wt %, about 0.06-0.5 wt %, about 0.08-0.5 wt %, about 0.1-0.5 wt %, about 0.15-0.5 wt %, about 0.2-0.5 wt %, about 0.25-0.5 wt %, about 0.3-0.5 wt %, about 0.35-0.5 wt %, about 0.4-0.5 wt %, about 0.45-0.5 wt %, about 0.02-0.45 wt %, about 0.02-0.4 wt %, about 0.02-0.35 wt %, about 0.02-0.3 wt %, about 0.02-0.25 wt %, about 0.02-0.2 wt %, about 0.02-0.15 wt %, about 0.02-0.1 wt %, about 0.02-0.08 wt %, about 0.02-0.06 wt %, about 0.02-0.04 wt %, about 0.05-3.5 wt %, about 0.1-0.3 wt %, about 0.15-0.25 wt %, about 0.15-0.2 wt %, about 0.2-0.25 wt %, about 0.04-0.1 wt %, about 0.06-1 wt %, about 0.08-1 wt %, about 0.04-0.15 wt %, about 0.06-0.15 wt %, about 0.08-0.15 wt %, about 0.1-0.15 wt %, about 0.04-0.2 wt %, about 0.06-0.2 wt %, about 0.08-0.2 wt %, about 0.1-0.2 wt %, about 0.15-0.2 wt %, or about 0.02-0.05 wt %, based on total weight of the composition. In certain embodiments, the silicone coating compositions may include the silicone surfactant in an amount of about 0.02 wt %, about 0.025 wt %, about 0.03 wt %, about 0.035 wt %, about 0.04 wt %, about 0.045 wt %, about 0.05 wt %, about 0.055 wt %, about 0.06 wt %, about 0.065 wt %, about 0.07 wt %, about 0.075 wt %, about 0.08 wt %, about 0.085 wt %, about 0.09 wt %, about 0.095 wt %, about 0.1 wt %, about 0.12 wt %, about 0.14 wt %, about 0.16 wt %, about 0.18 wt %, about 0.2 wt %, about 0.22 wt %, about 0.24 wt %, about 0.26 wt %, about 0.28 wt %, about 0.3 wt %, about 0.32 wt %, about 0.34 wt %, about 0.36 wt %, about 0.38 wt %, or about 0.4 wt %, based on total weight of the composition.

d. Water

The disclosed compositions further include water.

The water content of the disclosed compositions may range from about 10-50 wt %, based on total weight of the composition. In certain embodiments, the water content may range from about 10-45 wt %, about 15-40 wt %, about 10-35 wt %, about 10-30 wt %, about 10-25 wt %, about 15-50 wt %, about 20-50 wt %, about 25-50 wt %, about 30-50 wt %, about 35-50 wt %, about 40-50 wt %, about 45-50 wt %, about 5-45 wt %, about 10-40 wt %, about 15-35 wt %, about 20-30 wt %, about 15-25 wt %, or about 25-35 wt %, based on total weight of the composition. In certain embodiments, the water content of the disclosed compositions is about 10 wt %, about 12 wt %, about 14 wt %, about 16 wt %, about 18 wt %, about 20 wt %, about 22 wt %, about 24 wt %, about 26 wt %, about 28 wt %, about 30 wt %, about 32 wt %, about 34 wt %, about 36 wt %, about 38 wt %, about 40 wt %, about 42 wt %, about 44 wt %, about 46 wt %, about 48 wt %, or about 50 wt %, based on total weight of the composition.

e. Filler

The disclosed compositions may include one or more reinforcing filler components. Suitable fillers include, but are not limited to, calcium carbonate, barium sulfate, iron oxide, diatomaceous earth, melamine, quartz, crystalline silica, amorphous silica, fumed silica, titanium dioxide, alumina trihydrate, zinc oxide, zirconium oxide, zirconium silicate, zinc borate, chromic oxide, crystalline silica fine powder, amorphous silica fine powder, fumed silica powder, silicone rubber powder, glass powder, silica hydrogen, silica aero gel, diatomaceous earth, calcium silicate, aluminum silicate, titanium oxide, aluminum oxide, zinc oxide, ferrite, iron oxide, carbon black, graphite, mica, clay, and bentonite. In certain embodiments, the filler is fumed silica. In certain embodiments the filler is carbon black.

f. Additional Components

A variety of other ingredients may be included in the formulations of the disclosed compositions. In certain embodiments, the additives may include, but are not limited to, crosslinking agents, chain extenders, pigments, preservatives, antioxidants, reinforcing agents, antistatic agents, fillers, and combinations of any of these. The additive content of the disclosed compositions may range from about 0-20 wt %, based on total weight of the composition.

3. Properties of Silicone Compositions

The disclosed compositions can have a combination of desired properties. The compositions can have improved functional properties (e.g., ability to adhere to silicone, ability to be adhered to by a non-silicone material, mechanical properties) or aesthetic properties, or any combination thereof. In certain embodiments, the coating can adhere to a surface of a silicone rubber substrate.

4. Method of Making Silicone Compositions

The disclosed compositions may be prepared from a mixture including a water-based silicone elastomer composition, a silane adhesion promoter, a silicone surfactant, and water.

5. Methods of Using Silicone Compositions

The disclosed compositions can be used in a variety of exterior applications. In certain embodiments, the composition is used as a roof coating. In certain embodiments, the composition is used to coat a silicone rubber substrate. In certain embodiments, a method of coating a silicone rubber substrate includes applying the disclosed composition to the silicon rubber substrate to form a coated substrate, and applying an acrylic material to the coated substrate. In certain embodiments, the silicone rubber substrate in this method is an exterior roof of a structure. In certain embodiments, at least a portion of this exterior roof of the structure is coated with a silicone rubber coating.

The coating thickness of the disclosed compositions when applied to the silicone rubber substrate may be any suitable thickness (e.g. to avoid sagging), as understood by the person of ordinary skill in the art. For example, the coating thickness of the disclosed compositions when applied to the silicone rubber substrate may range from about 0.5-2 dry film mils. In certain embodiments, the coating thickness of the disclosed compositions when applied to the silicone rubber substrate may range from about 0.5-1.75 dry film mils, about 0.5-1.5 dry film mils, about 0.5-1.25 dry film mils, about 0.5-1 dry film mils, about 0.5-0.75 dry film mils, about 0.75-2 dry film mils, about 1-2 dry film mils, about 1.25-2 dry film mils, about 1.5-2 dry film mils, about 1.75-2 dry film mils, about 0.75-1.75 dry film mils, about 1-1.5 dry film mils, about 0.8-1.5 dry film mils, about 0.9-1.4 dry film mils, or about 1-1.3 dry film mils. In certain embodiments, the coating thickness of the disclosed compositions when applied to the silicone rubber substrate is about 0.5 dry film mils, about 0.6 dry film mils, about 0.7 dry film mils, about 0.8 dry film mils, about 0.9 dry film mils, about 1 dry film mils, about 1.05 dry film mils, about 1.1 dry film mils, about 1.15 dry film mils, about 1.2 dry film mils, about 1.25 dry film mils, about 1.3 dry film mils, about 1.35 dry film mils, about 1.4 dry film mils, about 1.5 dry film mils, about 1.6 dry film mils, about 1.7 dry film mils, about 1.8 dry film mils, about 1.9 dry film mils, or about 1.2 dry film mils.

The conversion from dry film mils to other units of measure is known to the person of ordinary skill in the art. In certain embodiments, 1.2 dry film mils may be about equal to 0.0012 inches. In certain embodiments, dry film thickness is related to wet film thickness by multiplying the wet film thickness by the volumetric ratio of solid matter to total matter in the wet film.

Common methods of measuring film thickness are known to the person of ordinary skill in the art. In certain embodiments, film thickness is measured by a magnetic film thickness gauge, for example, by magnetic pull-off. In certain embodiments, film thickness is measured by electronic magnetic flux. In certain embodiments, film thickness is measured by an eddy current gauge. In certain embodiments, film thickness is measured by a constant pressure probe. In certain embodiments, film thickness is measured by an ultrasonic technique. In certain embodiments, film thickness is measured by a micrometer. In certain embodiments, film thickness is measured by a destructive test. In certain embodiments, film thickness is measured by gravimetric analysis. In certain embodiments, film thickness is measured according to the ASTM D1005 standard.

6. EXAMPLES

The foregoing may be better understood by reference to the following examples, which are presented for purposes of illustration and are not intended to limit the scope of the disclosure.

Example 1

Coating Composition

A coating composition was prepared using the components and amounts set forth in Table 1.

TABLE 1

Exemplary Coating Composition

| Component | Trade Name/ Compound Name | Amount (wt %) |
|---|---|---|
| Water-Based Silicone Elastomer Composition | Dow Corning Allguard Silicone Elastomeric Coating | 69.492 |
| Silane Adhesion Promoter | γ-glycidoxypropyl-trimethoxysilane | 0.550 |
| Silicone Surfactant | 3-(polyoxyethylene)-propylheptamethyl-trisiloxane (CAS Number 67674-67-3) | 0.0350 |
| Water | — | 34.923 |

Example 2

Coating Composition Application

The composition set forth in Table 1 will be applied to the surface of an exterior roof that has been previously coated with a silicone rubber. It is expected that the composition will adhere to the surface of the silicone rubber, and allow for application of an acrylic roof coating to the surface of the composition.

It is to be understood that the invention is not limited in its application to the details of construction and the arrangement of components set forth in the above description. The invention is capable of other embodiments and of being practiced or carried out in various ways.

Thus, the invention provides, among other things, a silicone coating composition. Various features and advantages of the invention are set forth in the following claims.

What is claimed is:

1. A method of coating a silicone rubber substrate, the method comprising:
   (i) applying a coating composition to the silicone rubber substrate to form a coated substrate, said coating composition comprising:
      (a) about 50-80 wt% of a water-based silicone elastomer composition;
      (b) about 0.5-4.0 wt% of a silane adhesion promoter;
      (c) about 0.02-0.5 wt% of a silicone surfactant; and
      (d) about 10-50 wt% water; and
   (ii) applying an acrylic material to the coated substrate.

2. The method of claim 1, wherein the water-based silicone elastomer composition comprises a crosslinked product of a hydroxy-terminated polydimethylsiloxane polymer with dimethyl methyl((diethylamino)oxy) siloxane.

3. The method of claim 1, wherein the water-based silicone elastomer composition further comprises water, a cyclic siloxane, a non-ionic surfactant, calcium carbonate, titanium dioxide, and silicone dioxide.

4. The method of claim 1, wherein the silicone surfactant is 2,6,8-trimethyl-4-nonyloxypolyethyleneoxyethanol.

5. The method of claim 1, wherein the composition comprises the water-based silicone elastomer composition in an amount of 65-75 wt %.

6. The method of claim 1, wherein the silane adhesion promoter is γ-glycidoxypropyltrimethoxysilane.

7. The method of claim 1, wherein the composition comprises the silane adhesion promoter in an amount of 0.50-1.0 wt %.

8. The method of claim 1, wherein the silicone surfactant is 3-(polyoxyethylene)propylheptamethyltrisiloxane.

9. The method of claim 1, wherein the composition comprises the silicone surfactant in an amount of 0.020-0.050 wt %.

10. The method of claim 1, further comprising a pH-adjuster, a filler, a pigment, or any combination thereof.

11. The method of claim 1, wherein the coating composition is substantially free of acrylic materials.

12. The method of claim 1, wherein the coating can adhere to a surface of a silicone rubber substrate.

13. The method of claim 1, wherein the silicone rubber substrate is an exterior roof of a structure having a silicone rubber coating.

14. The method of claim 1, comprising applying the coating composition to the silicone rubber substrate at a thickness of about 0.5 to 2.0 dry film mils.

15. The method of claim 1, comprising applying the coating composition to the silicone rubber substrate at a thickness of about 0.8 to 1.5 dry film mils.

* * * * *